United States Patent
Yoshioka et al.

(10) Patent No.: US 8,067,526 B2
(45) Date of Patent: Nov. 29, 2011

(54) METHOD FOR PRODUCING POLYOXALKYLENE DERIVATIVE

(75) Inventors: Hiroki Yoshioka, Kanagawa (JP); Takashi Matani, Kanagawa (JP); Shuichi Yoshimura, Kanagawa (JP); Kazuhiro Hashimoto, Kanagawa (JP)

(73) Assignee: NOF Corporation, Tokyo (JP)

( * ) Notice: Subject to any disclaimer, the term of this patent is extended or adjusted under 35 U.S.C. 154(b) by 53 days.

(21) Appl. No.: 12/732,674

(22) Filed: Mar. 26, 2010

(65) Prior Publication Data

US 2010/0256325 A1    Oct. 7, 2010

(30) Foreign Application Priority Data

Mar. 27, 2009    (JP) ................. 2009-080459

(51) Int. Cl.
*C08G 64/00*    (2006.01)
*C08G 63/02*    (2006.01)

(52) U.S. Cl. ......... 528/313; 526/262; 526/285; 526/322

(58) Field of Classification Search ............... 526/262, 526/285, 322; 528/313
See application file for complete search history.

(56) References Cited

U.S. PATENT DOCUMENTS 6,825,331 B2    11/2004    Manoharan

FOREIGN PATENT DOCUMENTS

| EP | 0 605 963 A2 | 7/1994 |
| JP | 07-196925 A | 8/1995 |
| JP | 2007-501811 A | 2/2007 |
| WO | 96/41813 A2 | 12/1996 |
| WO | 2005/014035 A2 | 2/2005 |

*Primary Examiner* — Terressa Boykin
(74) *Attorney, Agent, or Firm* — Sughrue Mion, PLLC

(57) ABSTRACT

A method for producing a polyoxyalkylene derivative including: step (A) in which a polyoxyalkylene derivative having hydroxyl group(s) is reacted with a phthalimide derivative in the presence of an azo reagent and a phosphine reagent; step (B) in which the phthalimide groups of the compound obtained in step (A) are deprotected using a compound having a primary amino group; and step (C) in which impurities derived from the phthalimide derivative and the deprotection reagent are removed by adsorption or extraction.

10 Claims, No Drawings

METHOD FOR PRODUCING POLYOXALKYLENE DERIVATIVE

FIELD OF THE INVENTION

The present invention relates to a method for producing a polyoxyalkylene derivative having an oxyamino group or amino group, the derivative being suitable for use in modifying bio-related substances.

BACKGROUND OF THE INVENTION

As a result of innovations in genetic engineering, medicines employing bio-related substances such as intercellular messengers, e.g., hormones and cytokines, antibodies, and enzymes have been developed and investigated actively in recent years. After having been administered to a living body, these bio-related substances usually disappear from the living body due to glomerular filtration within the kidneys and the uptake of macrophages within the liver, spleen, etc. The bio-related substances hence have a short half-life period in the blood, and it is difficult to obtain a sufficient pharmacological effect. In order to overcome this problem, attempts to improve the behavior in living body have been made by encapsulating a bio-related substance in liposomes or polymer micelles or increasing the molecular weight or forming a hydration layer through chemical modification with an amphipathic polymer such as a sugar chain or polyethylene glycol, or albumin. Modification with a polyoxyalkylene has brought about effects such as a reduction in toxicity or antigenicity and an improvement in the solubility of sparingly water-soluble drugs.

In recent years, techniques have been actively investigated in which when a bio-related substance is modified with a polyoxyalkylene, a target site on the bio-related substance is selectively modified with a desired number of polyoxyalkylene segments without deactivating the active sites of the bio-related substance. Furthermore, there is a trend toward increases in the molecular weights of polyoxyalkylene derivatives in order to obtain a larger hydration layer with a smaller number of polyoxyalkylene chains. In particular, there is a desire for a high-molecular polyoxyalkylene derivative having an oxyamino group which selectively reacts with an aldehyde or ketone group to form a relatively stable oxime bond.

JP-A-7-196925 includes a statement concerning reagents for forming PEG hydrazone and PEG oxime bonds and protein derivatives of these. International Publication No. 96/041813 includes a statement concerning a polyoxyalkylene derivative having an oxyamino group for use in site-selective reactions. Moreover, JP-T-2007-501811 (the term "JP-T" as used herein means a published Japanese translation of a PCT patent application) includes a statement concerning a technique in which trans-glutaminase is introduced into a peptide and this glutaminase is used as a medium for bonding to a polyoxyalkylene derivative having an oxyamino group.

In the methods for producing a polyoxyalkylene derivative having an oxyamino group which are described in JP-A-7-196925, International Publication No. 96/041813, and JP-T-2007-501811, in a first stage, it is necessary to convert the terminal hydroxyl group of the polyoxyalkylene obtained by polymerization of oxyalkylene to a functional group such as an activated ester or an amine and so on. In a second stage, the functionalized polyoxyalkylene is reacted and thereby attached with a low-molecular compound having a protected oxyamino group. In a third stage, the protected oxyamino group is deprotected to thereby obtain the desired product.

The conventional production methods thus necessitate steps consisting of at least three stages, and purification by column chromatography, gel filtration, dialysis, etc. is performed in each stage, resulting in a considerably reduced yield and a prolonged production time. Because of this, those conventional methods are unsuitable for industrial production.

The polyoxyalkylene derivative described in U.S. Pat. No. 6,825,331 is obtained by a production method including introducing oxyphthalimide into the terminal hydroxyl group of a polyoxyalkylene using the Mitsunobu reaction, purifying the product by column chromatography, and then performing deprotection using a large amount of hydrazine. This production method results in a reduced yield due to purification by column chromatography, as stated above, and necessitates the use of a large amount of hydrazine, which is an inorganic base having poor handleability. It is therefore difficult to use this method for industrial production. It has also been ascertained that use of a polyoxyalkylene having a high molecular weight results in a decrease in purity.

As stated above, when the conventional production methods are used for producing a polyoxyalkylene having an oxyamino group, the number of production steps is large and there have been problems concerning, for example, a decrease in yield due to purification by column chromatography, etc. Furthermore, a high-molecular polyoxyalkylene having an oxyamino group is difficult to obtain as a high-purity product, and a product suitable for use as a modifying agent for bio-related substances has not been efficiently obtained so far.

As described above, there is a desire for a high-purity polyoxyalkylene derivative which has an oxyamino group and a high molecular weight and which can be effectively used in the modification of bio-related substances and can be industrially produced with ease.

SUMMARY OF THE INVENTION

An object of the invention is to provide a new production method by which a high-molecular polyoxyalkylene derivative having an oxyamino group or amino group and having a high purity can be efficiently obtained with ease.

The present inventors diligently made investigations in order to solve the problems described above. As a result, they have devised a method for easily producing a high-molecular polyoxyalkylene derivative which has an oxyamino group or amino group and has a high purity.

The invention is characterized in that steps ranging from the reaction of a polyoxyalkylene derivative with a phthalimide derivative to the deprotection of the phthalimide group of the compound obtained in the reaction are successively performed in one pot and the reaction product is subsequently purified.

Namely, the invention is as shown below.

[1] A method for producing a polyoxyalkylene derivative represented by the following formula (1), the method comprising successively performing the following steps (A), (B), and (C).

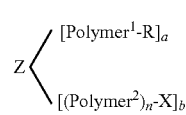

(In the formula, Z is a residue of a compound having 2 to 8 active hydrogen atoms; Polymer$^1$ and Polymer$^2$ each independently represent a polymer of an oxyalkylene group having 2 to 4 carbon atoms, Polymer$^1$ and Polymer$^2$ may have a side chain, and the polyoxyalkylene derivative represented by formula (1) has an overall molecular weight of 1,000 to 160,000; R represents either a hydrocarbon group having 1 to 20 carbon atoms or a protected functional group; X represents an oxyamino group or an amino group; a and b each independently are $0 \leq a \leq 8$, $1 \leq b \leq 8$, and $2 \leq a+b \leq 8$; and n is 1 or 0.)

Step (A): a step in which a polyoxyalkylene derivative having hydroxyl group(s) represented by the following formula (2) is reacted with a phthalimide derivative in the presence of an azo reagent and a phosphine reagent,

(2)

(wherein Z, Polymer$^1$, Polymer$^2$, R, a, b, and n are the same as defined above);

Step (B): a step in which deprotection of the phthalimide group(s) of the compound obtained in step (A) is performed using a deprotection reagent comprising an organic base having a primary amino group;

Step (C): a step in which impurities derived from the phthalimide derivative and the deprotection reagent are removed using step (C1) or (C2):

step (C1): an adsorption step in which an adsorbent is used in an organic solvent;

step (C2): an extraction step in which an organic solvent and an aqueous solution of an inorganic salt are used.

[2] The method for production according to [1] above wherein step (A) includes a dehydration step for removing water contained in the polyoxyalkylene derivative represented by formula (2), the dehydration step is a step, in which organic solvent, in which the polyoxyalkylene derivative represented by the formula (2) is dissolved, is refluxed, 1 to 10 times by weight the polyoxyalkylene derivative represented by the formula (2) of the organic solvent is used, and 5 to 75% by weight of the organic solvent is refluxed and distilled away at the azeotropic point or higher.

[3] The method for production according to [1] above wherein the phthalimide derivative to be used in step (A) is hydroxyphthalimide or phthalimide, and an amount of the phthalimide derivative is 1 to 20 equivalents per hydroxyl group of the polyoxyalkylene derivative represented by formula (2).

[4] The method for production according to [1] above wherein the azo reagent to be used in step (A) is diethyl azodicarboxylate or diisopropyl azodicarboxylate, and an amount of the azo reagent is 1 to 20 equivalents per hydroxyl group of the polyoxyalkylene derivative represented by formula (2).

[5] The method for production according to [1] above wherein the phosphine reagent to be used in step (A) is triphenylphosphine, and an amount of the phosphine reagent is 1 to 20 equivalents per hydroxyl group of the polyoxyalkylene derivative represented by formula (2).

[6] The method for production according to claim 1, wherein the deprotection reagent to be used in step (B) is ethylenediamine, diethylenetriamine, or tris(2-aminoethyl) amine, and an amount of the deprotection reagent is 3 to 200 equivalents per hydroxyl group of the polyoxyalkylene derivative represented by the formula (2).

[7] The method for production according to claim 1, wherein the organic solvent to be used in step (C1) is selected from toluene, ethyl acetate, chloroform, dichloromethane, acetonitrile, and tetrahydrofuran, and an amount of the organic solvent is 3 to 20 times by weight the amount of the polyoxyalkylene derivative represented by the formula (2).

[8] The method for production according to claim 1, wherein the adsorbent to be used in step (C1) is an adsorbent comprising any of aluminum oxide, magnesium oxide, and silicon dioxide, and an amount of the adsorbent is 0.1 to 5 times by weight the amount of the polyoxyalkylene derivative represented by the formula (2).

[9] The method for production according to claim 1, wherein the organic solvent to be used in step (C2) is selected from toluene, chloroform, and dichloromethane, and an amount of the organic solvent is 3 to 20 times by weight the amount of the polyoxyalkylene derivative represented by the formula (2).

[10] The method for production according to claim 1, wherein the aqueous solution to be used in step (C2) is a 1 to 25% by weight aqueous solution of an inorganic salt of an alkali metal, and an amount of the aqueous solution is 1 to 20 times by weight the amount of the polyoxyalkylene derivative represented by the formula (2).

[11] The method for production according to [1] above wherein Z in the polyoxyalkylene derivative represented by formula (1) is the residue formed by removing the hydroxyl groups from ethylene glycol, Polymer$^1$ is a polymer of an oxyethylene group and is bonded to Z through —O—, R is a methyl group, and a, b, and n respectively are a=1, b=1, and n=0.

[12] The method for production according to [1] above wherein Z in the polyoxyalkylene derivative represented by formula (1) is the residue formed by removing the hydroxyl groups from ethylene glycol, glycerol, diglycerol, hexaglycerol, or pentaerythritol, Polymer$^2$ is a polymer consisting of oxyethylene groups and is bonded to Z through —O—, a and b are a=0 and $2 \leq b \leq 8$, and n is n=1.

[13] The method for production according to [1] above wherein Z in the polyoxyalkylene derivative represented by formula (1) is the residue formed by removing the hydroxyl groups from glycerol, Polymer$^1$ and Polymer$^2$ are polymers consisting of oxyethylene groups and are bonded to Z through —O—, R is a methyl group, a and b are $1 \leq a \leq 2$, $1 \leq b \leq 2$, and a+b=3, and n is 1 or 0.

The invention is an industrially useful novel method for producing a high-molecular polyoxyalkylene derivative (1) which has an oxyamine group or amino group and is suitable for use in the modification of bio-related substances. By successively performing the production steps, a considerable omission or simplification in purification steps can be attained as compared with the conventional multistage production methods including a large number of production steps. Furthermore, although the conventional production methods have had a considerably reduced product yield because of the use of purification by column chromatography, gel filtration, dialysis, etc., the yield can be greatly improved by effectively using adsorption treatment or extraction and the desired derivative can be efficiently produced.

The high-molecular polyoxyalkylene derivative (1) having an oxyamino group which is obtained by the invention selectively reacts with an aldehyde or ketone group. Because of this, a desired number of polyoxyalkylene segments can be introduced into a target site on a bio-related substance without deactivating the active sites of the bio-related substance and without lowering the activity of the bio-related substance.

The term "bio-related substance" as used in the invention means any substance which is related to the living body. Examples thereof include substances constituting the living body and substances having a physiological activity against the living body (physiologically active substances).

Furthermore, the expression "steps (A), (B), and (C) are successively performed" means that steps (A), (B), and (C) are successively performed in one pot and the product is subjected to the next step without being isolated.

DETAILED DESCRIPTION OF THE INVENTION

In the polyoxyalkylene derivative of the following formula (1) in this specification (hereinafter often referred to as polyoxyalkylene derivative (1)), Polymer$^1$ and Polymer$^2$ each independently represent a polymer consisting of oxyethylene groups having 2 to 4 carbon atoms. Specific examples of the oxyalkylene group include ones having 2 to 4 carbon atoms, preferably 2 to 3 carbon atoms, such as an oxyethylene group, oxypropylene group, oxytrimethylene group, oxy-1-ethylethylene group, oxy-1,2-dimethylethylene group, and oxytetramethylene group. The oxyalkylene groups of Polymer$^1$ may be the same as or different from the oxyalkylene groups of Polymer$^2$. The oxyalkylene groups may have been added randomly or may have been added in a block arrangement, and may have side chains. In general, the smaller number of carbon atoms of the alkylene group, causes the higher hydrophilicity. Preferred are oxyethylene group and oxypropylene group. More preferred is oxyethylene group.

(1)

Although Polymer$^1$ and Polymer$^2$ represent a polymer of an oxyalkylene group, the derivative may have a linker between the polymer and either R or X. The linker is not particularly limited so long as it is a group capable of forming a covalent bond with each of the two. Preferably, however, examples thereof include groups having 1 to 8 carbon atoms, preferably 1 to 6 carbon atoms, such as alkylene groups, a phenylene group, and alkylene groups containing an ester bond, urethane bond, amide bond, ether bond, carbonate bond, or secondary amino group.

Polymer$^1$ and Polymer$^2$ have a molecular weight of preferably 1,000 to 80,000, more preferably 5,000 to 60,000, even more preferably 10,000 to 40,000. However, the overall molecular weight of the polyoxyalkylene derivative (1) does not exceed 160,000.

The molecular weight of the polyoxyalkylene derivative (1) is generally 1,000 to 160,000, preferably 5,000 to 80,000, more preferably 10,000 to 60,000.

In the polyoxyalkylene derivative of formula (1), X is an oxyamine group or an amino group, and preferably is an oxyamino group. These functional groups are capable of reacting with carboxyl groups, aldehyde groups, and ketone groups of bio-related substances.

In the polyoxyalkylene derivative of formula (1), the "residue of a compound having 2 to 8 active hydrogen atoms" represented by Z is the residue formed by removing all hydroxyl groups from a polyhydric alcohol, e.g., ethylene glycol, glycerol, diglycerol, hexaglycerol, or pentaerythritol. Preferably, Z is the residue formed by removing the hydroxyl groups from ethylene glycol, glycerol, or pentaerythritol. More preferably, Z is the residue formed by removing the hydroxyl groups from ethylene glycol.

In the specification, R is either a hydrocarbon group having 1 to 20 carbon atoms or a protected functional group. Specific examples of the hydrocarbon group include alkyl groups such as methyl, ethyl, propyl, isopropyl, butyl, t-butyl, pentyl, isopentyl, hexyl, and heptyl and aralkyl groups such as benzyl, butylphenyl, and trityl. The hydrocarbon group preferably is a hydrocarbon group having 1 to 7 carbon atoms, more preferably is an alkyl group having 1 to 4 carbon atoms, such as methyl, ethyl, or t-butyl, or benzyl, and even more preferably is methyl.

Specific examples of the protected functional group include amino, carboxyl, aldehyde, thiol and hydroxyl group. Specific examples of amino-protective groups include t-butylcarbamate, benzyl, and trityl; and t-butylcarbamate group is preferred. Specific examples of carboxyl-protective groups include t-butyl and benzyl; and benzyl group is preferred. Specific examples of aldehyde-protective groups include acetal groups including 3 to 9 carbon atoms; and a diethyl acetal group is preferred. Specific examples of thiol-protective groups and hydroxyl-protective groups include t-butyl, benzyl, trityl, t-butyldimethylsilyl, and t-butyldiphenylsilyl; and t-butyl and benzyl group are more preferred, and t-butyl group is even more preferred.

Those protective groups can be used to protect functional groups using a general production method such as that described in, for example, PROTECTIVE GROUPS IN ORGANIC SYNTHESIS (THEODORA W. GREENE et al., 1991), and deprotection thereof can be performed.

In formula (1), symbol a indicates the number of polymer chains of Polymer$^1$, which is a polymer of an oxyalkylene group, and a is 0 to 8, preferably 0 to 6, more preferably 0 to 2. Symbol b indicates the number of polymer chains of Polymer$^2$, which is a polymer consisting of oxyalkylene groups, and b is 1 to 8, preferably 1 to 6, more preferably 1 to 4. Symbol n indicates the presence or absence of Polymer$^2$, which is a polymer of an oxyalkylene group. When n=0, this indicates that Polymer$^2$ is absent. When n=1, Polymer$^2$ is present. a+b is 2 to 8, preferably 2 to 4, more preferably 2.

When the polyoxyalkylene derivative (1) is a linear polyoxyalkylene derivative, then a=b=1 and n=0. When the polyoxyalkylene derivative (1) is a polyoxyalkylene derivative which has a plurality of polyoxyalkylene polymer chains and further has a plurality of functional groups, then a=0, b is 2 to 8, and n=1. Furthermore, when the polyoxyalkylene derivative (1) is a polyoxyalkylene derivative in which Z is the residue formed by removing the hydroxyl groups from glycerol and which has one or two functional groups X, then a+b=3, and n is 1 or 0.

The polyoxyalkylene derivative (1) is produced by successively performing the following steps (A), (B), and (C) using a polyoxyalkylene derivative of the following formula (2) (hereinafter sometimes referred to as polyoxyalkylene derivative (2)) as a starting material.

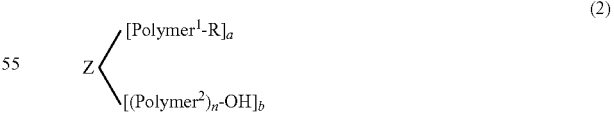
(2)

Step (A) preferably includes dehydration (A1), dilution (A2), and reaction (A3) in this order.

The dehydration (A1) in step (A) is conducted in order to remove water contained in the hydroxylated polyoxyalkylene derivative represented by formula (2). The dehydration is accomplished, for example, by azeotropic dehydration with an organic solvent. The organic solvent to be used in the dehydration step is not particularly limited so long as the solvent is an aprotic solvent with which the water present in the reaction system can be removed through azeotropic dehydration. However, toluene, xylene, or cyclohexene is preferred. More preferred is toluene.

The amount of the organic solvent is 1 to 10 times by weight, preferably 2 to 6 times by weight, more preferably 3 to 5 times by weight, the amount of the polyoxyalkylene derivative represented by formula (2). An antioxidant such as 2,6-di-tert-butyl-p-cresol may be added.

The polyoxyalkylene derivative of formula (2) is dissolved in an organic solvent. Thereafter, 5 to 75% by weight, preferably 10 to 50% by weight, of the organic solvent used is refluxed and distilled off at the azeotropic temperature or higher over a period from 30 minutes to 3 hours. In case where the amount distilled off is too small or the reflux period is shorter than 30 minutes, there is a possibility that dehydration might be insufficient and residual water might induce side reactions in the reaction (A3), resulting in a decrease in purity.

The dilution (A2) in step (A) is conducted in order to add a reaction solvent suitable for the reaction and to enable reaction in the reaction (A3) to proceed efficiently. The reaction solvent to be used for the dilution preferably is an organic solvent. Although the organic solvent is not particularly limited so long as it is an aprotic solvent, solvents which have been dehydrated are preferred. Preferred of these are chloroform, dichloromethane, tetrahydrofuran, acetonitrile, and dimethyl sulfoxide. More preferred is chloroform. The amount of the organic solvent is 1 to 50 times by weight, preferably 2 to 20 times by weight, more preferably 3 to 10 times by weight, the amount of the polyoxyalkylene derivative represented by formula (2). The purpose of using a solvent having a low water content is to inhibit the side reactions described above.

After the dehydration (A1), the inside of the system is cooled to or below the boiling point of the organic solvent to be used for dilution, and the solvent is introduced in a nitrogen stream and the mixture is stirred for 10 minutes or longer in order to homogenize the mixture.

The phthalimide derivative to be used in the reaction (A3) in step (A) is not particularly limited so long as it is a phthalimide derivative having a pKa of 13 or lower. However, the derivative preferably is hydroxyphthalimide or phthalimide, and more preferably is hydroxyphthalimide. The amount of the phthalimide derivative to be used is 1 to 20 equivalents, preferably 1.25 to 10 equivalents, more preferably 1.5 to 5 equivalents, per hydroxyl group of the polyoxyalkylene derivative represented by formula (2).

Examples of the azo reagent to be used in the reaction (A3) include 1,1'-azobis(N,N-dimethylformamide), 1,1'-(azodicarbonyl)dipiperidine, dibenzyl azodicarboxylate, diethyl azodicarboxylate, diisopropyl azodicarboxylate, dimethyl azodicarboxylate, 1,1'-azobis(N,N-diisopropylformamide), and 1,6-dimethyl-1,5,7-hexahydro-1,4,6,7-tetrazosin-2,5-dione. Preferred are diethyl azodicarboxylate and diisopropyl azodicarboxylate. More preferred is diisopropyl azodicarboxylate. The amount of the azo reagent to be used in the reaction (A3) is 1 to 20 equivalents, preferably 1.25 to 10 equivalents, more preferably 1.5 to 5 equivalents, per hydroxyl group of the polyoxyalkylene derivative represented by formula (2).

Examples of the phosphine reagent to be used in the reaction (A3) include dicyclohexylphenylphosphine, diethylphenylphosphine, 4-(dimethylamino)phenyldiphenylphosphine, diphenyl-2-pyridylphosphine, isopropyldiphenylphosphine, triisobutylphosphine, tri-n-butylphosphine, tri-t-butylphosphine, tricyclohexylphosphine, tri-n-hexylphosphine, tri-n-octylphosphine, and triphenylphosphine. Preferred is triphenylphosphine. The amount of the phosphine reagent to be used in the reaction (A3) is 1 to 20 equivalents, preferably 1.25 to 10 equivalents, more preferably 1.5 to 5 equivalents, per hydroxyl group of the polyoxyalkylene derivative represented by formula (2).

After the dilution (A2), the phthalimide derivative and a phosphine reagent are added and an azo reagent is finally introduced gradually to conduct the reaction (A3). Although reaction temperature is not particularly limited, room temperature is preferred. A reaction time of 5 minutes or longer is preferred. Reaction times shorter than 5 minutes may result in a decrease in conversion.

Step (B) is a deprotection step which is performed subsequently to step (A).

In this specification, the reagent for deprotection having a primary amino group to be used in step (B) is not particularly limited so long as the reagent is a low-molecular amine compound having a primary amino group. Preferably, however, the reagent is a polyamine compound having two or more primary amino groups. Specific examples thereof include organic bases such as ethylenediamine, trimethylenediamine, diethylenetriamine, tris(2-aminoethyl)amine, and triethylenetetramine. Preferred is ethylenediamine. The amount of the reagent for deprotection having a primary amino group is 3 to 30 equivalents, preferably 4 to 15 equivalents, more preferably 5 to 10 equivalents, per hydroxyl group of the polyoxyalkylene derivative represented by formula (2), when X is an oxyamino group. When X is an amino group, the amount of the reagent for deprotection is 5 to 200 equivalents, preferably 10 to 150 equivalents, more preferably 25 to 100 equivalents, per hydroxyl group of the derivative.

After the reaction (A3), the compound having a primary amino group is added to the system in a nitrogen stream to conduct the deprotection reaction (B). Although reaction temperature is not particularly limited, the temperature is preferably 10 to 80° C., more preferably 30 to 60° C. The reaction is conducted for a period of 1 hour or longer. Reaction times shorter than 1 hour may result in a decrease in conversion.

The use of a polyamine compound in the deprotection step (B) makes by-product impurities derived from the phthalimide derivative have a plurality of amino groups. Because of this, the impurities derived from the phthalimide derivative can be easily removed in the adsorption (C1) or extraction (C2) in the next step.

In step (B), the solvent used in step (A) may be displaced by water or an alcohol to perform deprotection.

Methods for displacing the solvent are not particularly limited. However, removal by vacuum distillation and extraction are preferred, and removal by vacuum distillation is more preferred. The solvent for displacement preferably is water, methanol, or ethanol, and more preferably is water or methanol. The amount of the solvent for displacement is 1 to 30 times by weight, preferably 2 to 20 times by weight, more preferably 3 to 10 times by weight, the amount of the polyoxyalkylene derivative represented by formula (2). The reagent for deprotection, reaction temperature, and reaction time in the deprotection reaction to be conducted after the solvent displacement are the same as described above.

After the reaction (A3), the solvent is distilled off at a reduced pressure, and a fresh solvent is introduced to stir the mixture for 10 minutes or longer in order to homogenize the mixture. Thereafter, the reagent for deprotection is added to conduct the deprotection reaction (B).

Step (C) is a purification step in which impurities derived from the phthalimide derivative, the reagent for deprotection, etc. are removed by means of adsorption of step (C1) or extraction of step (C2). Either of the steps can be used to accomplish the purification. However, in the case where the reagent for deprotection was used in a large amount in step (B), it is preferred to use the extraction of step (C2).

Step (C1) preferably includes dilution (C1-1), adsorption (C1-2), and crystallization (C1-3) in this order.

The dilution (C1-1) in step (C1) is conducted in order to reduce the viscosity of the system and improve the efficiency of adsorption and yield in the adsorption (C1-2). Usually organic solvents are used for the dilution (C1-1). The organic solvent to be used is not particularly limited so long as it is an aprotic solvent. Examples thereof include toluene, ethyl acetate, chloroform, dichloromethane, acetonitrile, and tetrahydrofuran. Preferred is toluene. One of these solvents may be used alone, or two or more thereof may be used in combination. The amount of the organic solvent is 3 to 20 times by weight, preferably 4 to 15 times by weight, more preferably 5 to 10 times by weight, the amount of the polyoxyalkylene derivative represented by formula (2).

After the deprotection step (B), the system is cooled to or below the boiling points of the organic solvent used in the system and of the solvent for dilution, and the organic solvent for dilution is added in a nitrogen stream and the mixture is stirred for 10 minutes or longer in order to homogenize the mixture.

The adsorption (C1-2) in step (C1) is conducted in order to remove the residual reagent for deprotection which was added in an excess amount in the deprotection step (B) and to remove by-product impurities derived from the phthalimide derivative and other substances remaining in the system, such as the azo reagent and the phosphine reagent. Examples of the adsorbent to be used in the adsorption (C1-2) include adsorbents which have the ability to adsorb bases and contain aluminum hydroxide, aluminum oxide, magnesium oxide, magnesium hydroxide, silicon oxide, etc. Preferred are adsorbents containing at least one member selected from aluminum oxide, magnesium oxide, silicon dioxide, and composite compounds of these. Examples of commercial products of such adsorbents include Kyowaad 200, which contains $Al(OH)_3 \cdot xH_2O$ ($1 \leq x \leq 4$), Kyowaad 600, which contains $2MgO \cdot 6SiO_2 \cdot yH_2O$ ($1 \leq y \leq 7$), Kyowaad 700, which contains $Al_2O_3 \cdot 9SiO_2 \cdot H_2O$, and Kyowaad 2000, which contains $Mg_{0.7}Al_{0.3}O_{1.15}$ (all manufactured by Kyowa Chemical Industry, Co., Ltd.). Preferred is $Al_2O_3 \cdot 9SiO_2 \cdot H_2O$. One adsorbent may be used alone, or two or more adsorbents may be used in combination. The amount of these adsorbents is 0.1 to 5 times by weight, preferably 0.2 to 3 times by weight, more preferably 0.3 to 2 times by weight, the amount of the polyoxyalkylene derivative represented by formula (2).

After the dilution (C1-1), an adsorbent slurry obtained by dispersing an adsorbent in an organic solvent is added to the system to conduct the adsorption (C1-2). The adsorbent slurry is one prepared by dispersing an adsorbent in the aforementioned solvent used in the dilution (C1-1). Adsorption temperature is not particularly limited. However, the temperature is preferably 30 to 80° C., more preferably 40 to 60° C. The time period of adsorption is from 15 minutes to 3 hours, preferably from 30 minutes to 1.5 hours. In case where the temperature is 30° C. or lower and the time period is shorter than 15 minutes, there is a possibility that removal of impurities might be insufficient. In case where the temperature exceeds 80° C. and the time period exceeds 3 hours, there is a possibility that such conditions might be causative of side reactions such as decomposition of the polyoxyalkylene derivative. Repeatedly conducting the adsorption (C1-2) improves the efficiency of purification. Although the number of adsorption operations is not particularly limited, the number thereof is preferably 1 to 4, more preferably 2 to 3. In case where the number thereof is increased to 5 or larger, there is the possibility of resulting in a decrease in final yield.

The adsorbent used for the adsorption is removed by filtration. Although the filtration is not particularly limited, it is preferred to use a filtration aid. In this operation, the cake is sufficiently washed with an organic solvent in order to prevent a decrease in final yield.

The crystallization (C1-3) in step (C1) is conducted in order to remove impurities which remain without being removed by the adsorption (C1-2). A good solvent is used for dissolution in the crystallization (C1-3) without particular limitations so long as it is an aprotic solvent. Examples thereof include toluene, ethyl acetate, acetonitrile, and tetrahydrofuran. Preferred are toluene and ethyl acetate. More preferred is ethyl acetate. One of these solvents may be used alone, or two or more thereof may be used in combination. Examples of poor solvents usable for the crystallization include hexane, diethyl ether, and methyl t-butyl ether. Preferred is hexane. The amount of the good solvent to be used in the crystallization (C1-3) is 1 to 50 times by weight, preferably 2.5 to 25 times by weight, more preferably 4 to 15 times by weight, the amount of the polyoxyalkylene derivative represented by formula (2). The amount of the poor solvent is 1 to 50 times by weight, preferably 2.5 to 25 times by weight, more preferably 4 to 15 times by weight, the amount of the polyoxyalkylene derivative represented by formula (2).

After the adsorption (C1-2), a poor solvent is added to the system and the crystallization (C1-3) is conducted in a nitrogen stream. The crystallization temperature is 0 to 40° C., preferably 10 to 30° C. In case where the temperature exceeds 40° C., there is a possibility that the polyoxyalkylene derivative might dissolve, resulting in a decrease in yield. A crystallization period of 15 minutes or longer is preferred. In case where the period of crystallization is shorter than 15 minutes, there is a possibility that impurity removal might be insufficient. Repeatedly conducting the crystallization (C1-3) improves the efficiency of purification. Although the number of crystallization operations is not particularly limited, the number thereof is preferably 1 to 5, more preferably 2 to 4.

The crystals obtained are dried under reduced pressure.

Step (C2) includes extraction (C2-1), dehydration (C2-2), and crystallization (C2-3) in this order.

The extraction (C2-1) in step (C2) is conducted in order to remove the residual reagent for deprotection which was added in an excess amount in the deprotection step (B) and to remove by-product impurities derived from the phthalimide derivative and other substances. An organic solvent is used in the extraction (C2-1) without particular limitations so long as it is an aprotic solvent. Examples thereof include toluene, chloroform, and dichloromethane. Preferred is dichloromethane. The amount of the organic solvent is 3 to 20 times by weight, preferably 4 to 15 times by weight, more preferably 5 to 10 times by weight, the amount of the polyoxyalkylene derivative represented by formula (2).

An aqueous solution is used for the extraction (C2-1), which is a 1 to 25% by weight aqueous solution of an inorganic salt of an alkali metal. Although the inorganic salt of an alkali metal is not particularly limited, the salt preferably is an alkali-metal halide, and more preferably is sodium chloride. The amount of the aqueous solution is 1 to 20 times by weight, preferably 2 to 15 times by weight, more preferably 3 to 10 times by weight, the amount of the polyoxyalkylene derivative represented by formula (2).

After the deprotection step (B), an organic solvent for extraction is added and the mixture is stirred for 10 minutes or longer in order to homogenize the mixture. Thereto is added the aqueous solution. In the case of the extraction step, the time period for separation into layers is preferably from 1 minute to 6 hours, more preferably from 10 minutes to 3 hours, although the period is not particularly limited. Extraction temperature is not particularly limited. However, the temperature is preferably 10 to 80° C., more preferably 20 to 60° C. Repeatedly conducting the extraction (C2-1) improves the efficiency of purification. Although the number of extraction operations is not particularly limited, the number thereof is preferably 1 to 4, more preferably 2 to 3. In case where the number thereof is increased to 5 or larger, there is the possibility of resulting in a decrease in final yield.

The dehydration (C2-2) in step (C2) is conducted in order to remove water remaining in the organic layer in the extraction (C2-1). A dehydrating agent is used in the dehydration (C2-2) without particular limitations, and examples thereof include anhydrous magnesium sulfate and anhydrous sodium sulfate. Preferred is anhydrous magnesium sulfate. The amount of the dehydrating agent is 1 to 100% by weight, preferably 3 to 50% by weight, more preferably 5 to 30% by weight, based on the polyoxyalkylene derivative represented by formula (2).

After the extraction (C2-1), a dehydrating agent is added and the mixture is stirred. The time period of stirring is not particularly limited. However, the period of stirring is preferably from 5 minutes to 4 hours, more preferably from 10 minutes to 2 hours. Dehydration temperature is not particularly limited. However, the temperature is preferably 10 to 60° C., more preferably 20 to 40° C.

The dehydrating agent used for the dehydration is removed by filtration. Although the filtration is not particularly limited, it is preferred to use a filtration aid. In this operation, the cake is sufficiently washed with an organic solvent in order to prevent a decrease in final yield.

The crystallization (C2-3) in step (C2) is conducted in order to remove impurities which remain without being removed by the extraction (C2-1). The solvent, temperature, and time period to be used for the crystallization are the same as in the crystallization (C1-3).

Through the series of simple production steps described above, the hydroxyl groups in formula (2) can be converted to oxyamino groups or amino groups which are capable of combining with bio-related substances.

According to the invention, a high-molecular polyoxyalkylene derivative (1) having oxyamino groups or amino groups and having a high purity can be industrially produced efficiently while greatly improving product yield. Furthermore, since the high-purity polyoxyalkylene derivative (1) obtained by the invention selectively reacts with aldehyde or ketone groups, the polyoxyalkylene can be introduced into a bio-related substance without lowering the activity of the bio-related substance.

EXAMPLES

The invention will be explained below in greater detail on the basis of Examples. For the analysis and identification of compounds in the Examples, use was made of $^1$H-NMR and HPLC.

<Method of $^1$H-NMR Analysis>

For $^1$H-NMR analysis, use was made of JNM-ECP400, manufactured by JEOL DATUM Ltd. The integrals in the NMR data are theoretical values.

<Method of HPLC Analysis>

[In the Case where X in Formula (1) is Oxyamino Group]

Twenty milligrams of a polyoxyalkylene derivative having oxyamino groups was dissolved in 2 mL of 0.1-M acetic acid buffer solution (pH, 4.0). Subsequently, 68 µL of a methanol solution of terephthalaldehyde (45 mg/mL) and 128 µL of an aqueous solution of sodium cyanoborohydride (10 mg/mL) were added thereto and dissolved. The mixture was reacted with stirring at 75° C. for 3 hours. The whole reaction solution was added to a gel filtration column (PD-10, manufactured by Amersham Biosciences Ltd.) equilibrated with an ammonium formate buffer solution (pH, 8.0) for use as an eluent in the HPLC measurement. The eluent was further added, and the fraction of high-molecular components which was eluted first was collected in a vial for HPLC measurement. An HPLC measurement was made under the following conditions.

HPLC apparatus: Alliance HPLC System (manufactured by Waters Inc.)
Column: column for anion exchange chromatography Asahipak ES-502N (manufactured by Showa Denko K.K.)
Flow rate: 1.0 mL/min
Analysis time: 20 minutes
Column temperature: 30° C.
Injection amount: 20 µL
Detector: differential refractometer detector (RI)
Mobile phase: ammonium formate buffer solution (pH 8.0)

[In the Case where X in Formula (1) is Amino Group]

Fifty milligrams of a polyoxyalkylene derivative having amino groups was dissolved in 10 g of a sodium phosphate buffer solution for use as an eluent in the HPLC measurement. Thus, a test sample was prepared. An HPLC measurement was made under the following conditions.

HPLC apparatus: Alliance HPLC System (manufactured by Waters Inc.)
Column: column for cation exchange chromatography TSK-gel SP-5PW (manufactured by Tosho Corp.)
Flow rate: 0.5 mL/min
Analysis time: 20 minutes
Column temperature: 40° C.
Injection amount: 20 µL
Detector: differential refractometer detector (RI)
Mobile phase: sodium phosphate buffer solution (pH 6.5)

Example 1

Synthesis of Polyoxyalkylene Derivative (1) (In the case where R=methyl; Polymer$^1$=polyoxyethylene; X=oxyamino; Z=residue formed by removing the hydroxyl groups from ethylene glycol; a=1; b=1; and n=0)

Example 1-1

In the Case of Molecular Weight of about 5,000:

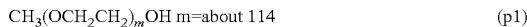
$CH_3(OCH_2CH_2)_m OH$ m=about 114 (p1)

Two hundred grams (0.04 mol) of a monomethoxypolyoxyethylene (p1) and 600 g of toluene were introduced into a 1-L four-necked flask equipped with a thermometer, nitrogen bubbling tube, stirrer, Dean-Stark tube, and condenser. The contents were heated to 60° C. with stirring and nitrogen bubbling to dissolve the compound (p1). The solution was heated to 110° C., and about 300 g of a fraction was distilled off under azeotropic condition with toluene. Dehydration was thus conducted. The solution was cooled to 40° C., and 1.0 kg of dehydrated chloroform was added thereto. Furthermore, 19.6 g (0.12 mol) of hydroxyphthalimide and 31.5 g (0.12 mol) of triphenylphosphine were added. Thereafter, 24.3 g (0.12 mol) of diisopropyl azodicarboxylate was added, and the mixture was reacted at room temperature for 2 hours.

Thereto was added 19.2 g (0.32 mol) of ethylenediamine. The resultant mixture was reacted at 60° C. for 4 hours. Thereto were added 2.0 kg of toluene and 50 g of an adsorbent ($Al_2O_3 \cdot 9SiO_2 \cdot H_2O$; trade name, Kyowaad 700; manufactured by Kyowa Chemical Industry Co., Ltd.). This mixture was stirred at 40° C. for 30 minutes to perform an adsorption treatment, and was then filtered. About 2.0 kg of a fraction was removed at 40° C. under slightly reduced pressure and then cooled to room temperature. Thereto was added 2.0 kg of n-hexane to perform crystallization. The crystals were recovered by filtration and then dissolved in 2.0 kg of ethyl acetate at 40° C. After the solution was cooled to room temperature, 1.5 kg of n-hexane was added to perform crystallization. The crystals were recovered by filtration and washed with 1.0 kg of n-hexane. The crystals were recovered by filtration and dried under vacuum to obtain 180 g of the following compound (p2).

$^1$H-NMR ($D_2O$) δ (ppm): 3.40-4.00 (454H, m, —O(C$\underline{H}_2$ C$\underline{H}_2$O)$_m$C$\underline{H}_2$—), 3.39 (3H, s, —C$\underline{H}_3$)

HPLC: 99%

Degree of phthalimide introduction: >99% (calculated through $^1$H-NMR before addition of ethylenediamine)
Value determined by taking the integral of the methoxy-group-derived peak at δ of 3.38 ppm as 3, dividing the integral of the phthalimide-group-derived peak at 7.70-7.85 ppm by 4, and converting the quotient to a percentage.

$$CH_3(OCH_2CH_2)_m ONH_2 \text{ m=about 114} \qquad (p2)$$

Example 1-2

In the Case of Molecular Weight of about 40,000:

$$CH_3(OCH_2CH_2)_m OH \text{ m=about 909} \qquad (p3)$$

Two hundred grams (5.0 mmol) of a monomethoxypolyoxyethylene (p3) and 600 g of toluene were introduced into a 1-L four-necked flask equipped with a thermometer, nitrogen bubbling tube, stirrer, Dean-Stark tube, and condenser. The contents were heated to 60° C. with stirring and nitrogen bubbling to dissolve the compound (p3). The solution was heated to 110° C., and about 300 g of a fraction was distilled off under azeotropic condition with toluene. Dehydration was thus conducted. The solution was cooled to 40° C., and 1.0 kg of dehydrated chloroform was added thereto. Furthermore, 2.4 g (15.0 mmol) of hydroxyphthalimide and 3.9 g (15.0 mmol) of triphenylphosphine were added. Thereafter, 3.0 g (15.0 mmol) of diisopropyl azodicarboxylate was added, and the mixture was reacted at room temperature for 2 hours.

Thereto was added 3.0 g (50.0 mmol) of ethylenediamine. The resultant mixture was reacted at 60° C. for 4 hours. Thereto were added 2.0 kg of toluene and 50 g of an adsorbent (Kyowaad 700, manufactured by Kyowa Chemical Industry Co., Ltd.; trade name). This mixture was stirred at 40° C. for 30 minutes to perform an adsorption treatment, and was then filtered. About 2.0 kg of a fraction was removed at 40° C. under slightly reduced pressure and then cooled to room temperature. Thereto was added 1.0 kg of n-hexane to perform crystallization. The crystals were recovered by filtration and then dissolved in 2.0 kg of ethyl acetate at 40° C. After the solution was cooled to room temperature, 1.0 kg of n-hexane was added to perform crystallization. The crystals were recovered by filtration and washed with 1.0 kg of n-hexane. The crystals were taken out by filtration and dried under vacuum to obtain 174 g of the following compound (p4).

$^1$H-NMR ($D_2O$) δ (ppm): 3.40-4.00 (3, 636H, m, —O(C$\underline{H}_2$ C$\underline{H}_2$O)$_m$C$\underline{H}_2$—), 3.39 (3H, s, —C$\underline{H}_3$)

HPLC: 98%

$$CH_3(OCH_2CH_2)_m ONH_2 \text{ m=about 909} \qquad (p4)$$

Example 2-1

Synthesis of Polyoxyalkylene Derivative (1) (In the case where R=t-butyl; Z=residue formed by removing the hydroxyl groups from ethylene glycol; Polymer$^1$=polyoxyethylene; X=oxyamino; a=1; b=1; n=0; and the molecular weight is about 40,000)

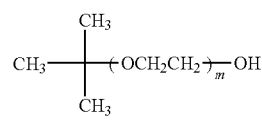

(p8)

m = about 909

Two hundred grams (5.0 mmol) of a mono-t-butoxypoly(ethylene oxide) (p8) and 600 g of toluene were introduced into a 1-L four-necked flask equipped with a thermometer, nitrogen bubbling tube, stirrer, Dean-Stark tube, and condenser. The contents were heated to 60° C. with stirring and nitrogen bubbling to dissolve the compound (p8). The solution was heated to 110° C., and about 300 g of a fraction was distilled off under azeotropic condition with toluene. Dehydration was thus conducted. The solution was cooled to 40° C., and 1.0 kg of dehydrated chloroform was added thereto. Furthermore, 2.4 g (15.0 mmol) of hydroxyphthalimide and 3.9 g (15.0 mmol) of triphenylphosphine were added. Thereafter, 3.0 g (15.0 mmol) of diisopropyl azodicarboxylate was added, and the mixture was reacted at room temperature for 2 hours.

Thereto was added 3.0 g (50.0 mmol) of ethylenediamine. The resultant mixture was reacted at 60° C. for 4 hours. Thereto were added 2.0 kg of toluene and 50 g of an adsorbent (Kyowaad 700, manufactured by Kyowa Chemical Industry Co., Ltd.; trade name). This mixture was stirred at 40° C. for 30 minutes to perform an adsorption treatment, and was then filtered. About 2.0 kg of a fraction was removed at 40° C. under slightly reduced pressure and then cooled to room temperature. Thereto was added 1.0 kg of n-hexane to perform crystallization. The crystals were recovered by filtration and then dissolved in 2.0 kg of ethyl acetate at 40° C. After the solution was cooled to room temperature, 1.0 kg of n-hexane was added to perform crystallization. The crystals were recovered by filtration and washed with 1.0 kg of n-hexane. The crystals were recovered by filtration and dried under vacuum to obtain 174 g of the following compound (p9).

$^1$H-NMR ($D_2O$) δ (ppm): 3.40-4.00 (3, 636H, m, —O(C$\underline{H}_2$ C$\underline{H}_2$O)$_m$C$\underline{H}_2$—), 1.21 (9H, s, —C(C$\underline{H}_3$)$_3$)

HPLC: 94%

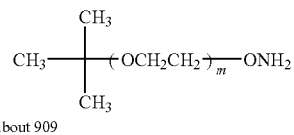

(p9)

m = about 909

Example 2-2

Synthesis of Polyoxyalkylene Derivative (1) through Extraction Step (In the case where R=t-butyl; Z=residue formed by removing the hydroxyl groups from ethylene glycol; Polymer¹=polyoxyethylene; X=oxyamino; a=1; b=1; n=0; and the molecular weight is about 40,000)

Two hundred grams (5.0 mmol) of a mono-t-butoxypoly(ethylene oxide) (p8) and 600 g of toluene were introduced into a 1-L four-necked flask equipped with a thermometer, nitrogen bubbling tube, stirrer, Dean-Stark tube, and condenser. The contents were heated to 60° C. with stirring and nitrogen bubbling to dissolve the compound (p8). The solution was heated to 110° C., and about 300 g of a fraction was distilled off under azeotropic condition with toluene. Dehydration was thus conducted. The solution was cooled to 40° C., and 1.0 kg of dehydrated chloroform was added thereto. Furthermore, 2.4 g (15.0 mmol) of hydroxyphthalimide and 3.9 g (15.0 mmol) of triphenylphosphine were added. Thereafter, 3.0 g (15.0 mmol) of diisopropyl azodicarboxylate was added, and the mixture was reacted at room temperature for 2 hours.

After the reaction, the chloroform was distilled off at a reduced pressure, and 600 g of toluene was added. Furthermore, 1.0 kg of ion-exchanged water was added. The contents were mixed and stirred at room temperature for 15 minutes. After separation into layers, the aqueous layer was recovered and 3.0 g (50.0 mmol) of ethylene diamine was added thereto. The mixture was reacted at 40° C. for 4 hours. Two hundred and fifty grams of sodium chloride was added thereto and dissolved therein, and 1.0 kg of dichloromethane was added. This mixture was mixed and stirred at room temperature for 15 minutes. After separation into layers, the organic layer was recovered, and about 1.0 kg of a fraction was removed at 40° C. under slightly reduced pressure. Thereto was added 1.0 kg of ethyl acetate. The mixture was stirred for 10 minutes, and 50 g of anhydrous magnesium sulfate was added thereto to dehydrate the mixture at 40° C. Thereafter, the mixture was filtered, and 1.0 kg of n-hexane was added to the filtrate to perform crystallization. The crystals were recovered by filtration and then dissolved in 2.0 kg of ethyl acetate at 40° C. After the solution was cooled to room temperature, 1.0 kg of n-hexane was added thereto to perform crystallization. The crystals were recovered by filtration and washed with 1.0 kg of n-hexane. The crystals were recovered by filtration and dried under vacuum to obtain 176 g of the following compound (p9)

¹H-NMR (D₂O) δ (ppm): 3.40-4.00 (3, 636H, m, —O($\underline{CH_2}$$\underline{CH_2}$O)$_m$$\underline{CH_2}$—), 1.21 (9H, s, —C($\underline{CH_3}$)₃)

HPLC: 93%

Example 3

Synthesis of Polyoxyalkylene Derivative (1) (In the case where R=methyl; Polymer¹=polyoxyethylene; X=oxyamino; Z=residue formed by removing the hydroxyl groups from glycerol; a=2; b=1; n=0; and the molecular weight is about 40,000)

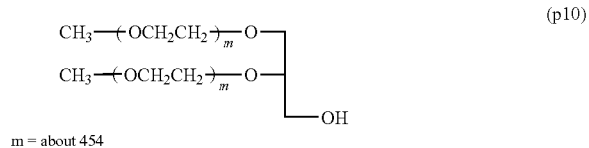

(p10)

m = about 454

Two hundred grams (5.0 mmol) of the compound (p10) and 600 g of toluene were introduced into a 1-L four-necked flask equipped with a thermometer, nitrogen bubbling tube, stirrer, Dean-Stark tube, and condenser. The contents were heated to 60° C. with stirring and nitrogen bubbling to dissolve the compound (p10). The solution was heated to 110° C., and about 300 g of a fraction was distilled off under azeotropic condition with toluene. Dehydration was thus conducted. The solution was cooled to 40° C., and 1.0 kg of dehydrated chloroform was added thereto. Furthermore, 2.4 g (15.0 mmol) of hydroxyphthalimide and 3.9 g (15.0 mmol) of triphenylphosphine were added. Thereafter, 3.0 g (15.0 mmol) of diisopropyl azodicarboxylate was added, and the mixture was reacted at room temperature for 2 hours.

Thereto was added 3.0 g (50.0 mmol) of ethylenediamine. The resultant mixture was reacted at 60° C. for 4 hours. Thereto were added 2.0 kg of toluene and 50 g of an adsorbent (Kyowaad 700, manufactured by Kyowa Chemical Industry Co., Ltd.; trade name). This mixture was stirred at 40° C. for 30 minutes to perform an adsorption treatment, and was then filtered. About 2.0 kg of a fraction was removed at 40° C. under slightly reduced pressure and then cooled to room temperature. Thereto was added 1.0 kg of n-hexane to perform crystallization. The crystals were recovered by filtration and then dissolved in 2.0 kg of ethyl acetate at 40° C. After the solution was cooled to room temperature, 1.0 kg of n-hexane was added to perform crystallization. The crystals were recovered by filtration and washed with 1.0 kg of n-hexane. The crystals were recovered by filtration and dried under vacuum to obtain 169 g of the following compound (p11).

¹H-NMR (D₂O) δ (ppm): 3.40-4.00 (3, 636H, m, —$\underline{CH_2}$O ($\underline{CH_2CH_2O}$)$_m$—), $\underline{CHO(CH_2CH_2O)_m}$—, 3.39 (6H, $\overline{s}$, —$\overline{CH_3}$)

HPLC: 93%

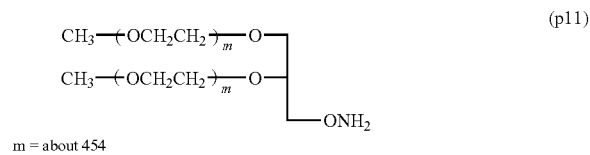

m = about 454

Example 4

Synthesis of Polyoxyalkylene Derivative (1) (In the case where Polymer²=polyoxyethylene; X=oxyamino; Z=residue formed by removing the hydroxyl groups from pentaerythritol; a=0; b=4; n=1; and the molecular weight is about 20,000)

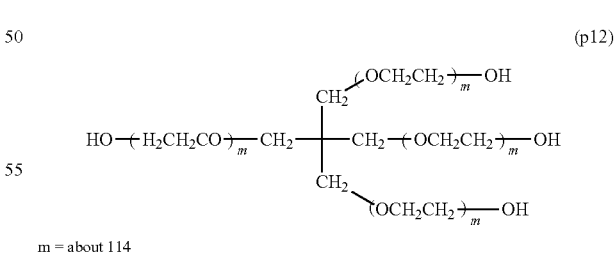

m = about 114

Two hundred grams (0.01 mol) of the compound (p12) and 600 g of toluene were introduced into a 1-L four-necked flask equipped with a thermometer, nitrogen bubbling tube, stirrer, Dean-Stark tube, and condenser. The contents were heated to 60° C. with stirring and nitrogen bubbling to dissolve the compound (p12). The solution was heated to 110° C., and about 300 g of a fraction was distilled off under azeotropic condition with toluene. Dehydration was thus conducted. The solution was cooled to 40° C., and 1.0 kg of dehydrated chloroform was added thereto. Furthermore, 13.1 g (0.08 mol) of hydroxyphthalimide and 21.0 g (0.08 mol) of triphenylphosphine were added. Thereafter, 16.2 g (0.08 mol) of diisopropyl azodicarboxylate was added, and the mixture was reacted at room temperature for 2 hours.

Thereto was added 14.4 g (0.24 mol) of ethylenediamine. The resultant mixture was reacted at 60° C. for 4 hours. Thereto were added 2.0 kg of toluene and 50 g of an adsorbent (Kyowaad 700, manufactured by Kyowa Chemical Industry Co., Ltd.; trade name). This mixture was stirred at 40° C. for 30 minutes and filtered. Furthermore, 50 g of the adsorbent (Kyowaad 700, manufactured by Kyowa Chemical Industry Co., Ltd.; trade name) was added to the filtrate to perform an adsorption treatment step again. About 2.0 kg of a fraction was removed at 40° C. under slightly reduced pressure and then cooled to room temperature. Thereto was added 1.0 kg of n-hexane to perform crystallization. The crystals were recovered by filtration and then dissolved in 2.0 kg of ethyl acetate at 40° C. After the solution was cooled to room temperature, 1.0 kg of n-hexane was added to perform crystallization. The crystals were recovered by filtration and washed with 1.0 kg of n-hexane. The crystals were recovered by filtration and dried under vacuum to obtain 168 g of the following compound (p13).

$^1$H-NMR (D$_2$O) δ (ppm): 3.40-4.10 (1, 818H, m, C—CH$_2$O(CH$_2$CH$_2$O)$_m$CH$_2$—)
HPLC: 98%

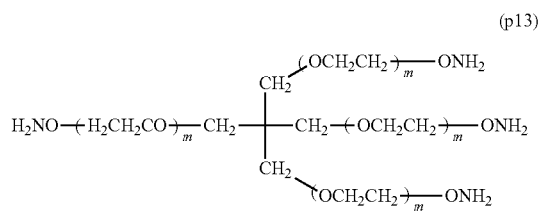

(p13)

m = about 114

Example 5-1

Synthesis of Polyoxyalkylene Derivative (1) (In the case where R=methyl; Polymer$^1$=polyoxyethylene; X=amino; Z=residue formed by removing the hydroxyl groups from ethylene glycol; a=1; b=1; n=0; and the molecular weight is about 40,000)

Two hundred grams (5.0 mmol) of a monomethoxypolyoxyethylene (p3) and 600 g of toluene were introduced into a 1-L four-necked flask equipped with a thermometer, nitrogen bubbling tube, stirrer, Dean-Stark tube, and condenser. The contents were heated to 60° C. with stirring and nitrogen bubbling to dissolve the compound (p3). The solution was heated to 110° C., and about 300 g of a fraction was distilled off under azeotropic condition with toluene. Dehydration was thus conducted. The solution was cooled to 40° C., and 1.0 kg of dehydrated chloroform was added thereto. Furthermore, 2.2 g (15.0 mmol) of phthalimide and 3.9 g (15.0 mmol) of triphenylphosphine were added. Thereafter, 3.0 g (15.0 mmol) of diisopropyl azodicarboxylate was added, and the mixture was reacted at room temperature for 2 hours.

Thereto was added 3.0 g (50.0 mmol) of ethylenediamine. The resultant mixture was reacted at 60° C. for 4 hours. Thereto were added 2.0 kg of toluene and 50 g of an adsorbent (Kyowaad 700, manufactured by Kyowa Chemical Industry Co., Ltd.; trade name). This mixture was stirred at 40° C. for 30 minutes to perform an adsorption treatment, and was then filtered. About 2.0 kg of a fraction was removed at 40° C. under slightly reduced pressure and then cooled to room temperature. Thereto was added 1.0 kg of n-hexane to perform crystallization. The crystals were recovered by filtration and then dissolved in 2.0 kg of ethyl acetate at 40° C. After the solution was cooled to room temperature, 1.0 kg of n-hexane was added to perform crystallization. The crystals were recovered by filtration and washed with 1.0 kg of n-hexane. The crystals were recovered by filtration and dried under vacuum to obtain 171 g of the following compound (p14).

$^1$H-NMR (D$_2$O) δ (ppm): 3.40-4.00 (3, 636H, m, —O(CH$_2$CH$_2$O)$_m$CH$_2$—), 3.39 (3H, s, —CH$_3$), 3.14 (2H, t, —CH$_2$NH$_2$)
HPLC: 96%

CH$_3$(OCH$_2$CH$_2$)$_m$NH$_2$ m=about 909     (p14)

Example 5-2

Synthesis of Polyoxyalkylene Derivative (1) through Extraction Step (In the case where R=methyl; Polymer$^1$=polyoxyethylene; X=amino; Z=residue formed by removing the hydroxyl groups from ethylene glycol; a=1; b=1; n=0; and the molecular weight is about 40,000)

Two hundred grams (5.0 mmol) of a monomethoxypolyoxyethylene (p3) and 600 g of toluene were introduced into a 1-L four-necked flask equipped with a thermometer, nitrogen bubbling tube, stirrer, Dean-Stark tube, and condenser. The contents were heated to 60° C. with stirring and nitrogen bubbling to dissolve the compound (p3). The solution was heated to 110° C., and about 300 g of a fraction was distilled off under azeotropic condition with toluene. Dehydration was thus conducted. The solution was cooled to 40° C., and 1.0 kg of dehydrated chloroform was added thereto. Furthermore, 2.2 g (15.0 mmol) of phthalimide and 3.9 g (15.0 mmol) of triphenylphosphine were added. Thereafter, 3.0 g (15.0 mmol) of diisopropyl azodicarboxylate was added, and the mixture was reacted at room temperature for 2 hours.

After the reaction, the chloroform was distilled off at a reduced pressure, and 800 g of methanol was added. The mixture was stirred for 10 minutes. Thereafter, 3.0 g (50.0 mmol) of ethylenediamine was added, and the mixture was reacted at 40° C. for 4 hours. Thereto was added 1.0 kg of dichloromethane. After the mixture was stirred for 10 minutes, 600 g of 20% aqueous sodium chloride solution was added and the resultant mixture was mixed and stirred at room temperature for 15 minutes. After separation into layers, the organic layer was recovered and extracted with the same amount of 20% aqueous sodium chloride solution. The organic layer was recovered, and about 1.0 kg of a fraction was withdrawn therefrom at 40° C. and a slightly reduced pressure. Thereto was added 1.0 kg of ethyl acetate. The mixture was stirred for 10 minutes, and 50 g of anhydrous magnesium sulfate was added thereto to dehydrate the mixture at 40° C. Thereafter, the mixture was filtered, and 1.0 kg of n-hexane was added to the filtrate to perform crystallization. The crystals were recovered by filtration and then dissolved in 2.0 kg of ethyl acetate at 40° C. After the solution was cooled to room temperature, 1.0 kg of n-hexane was added thereto to perform crystallization. The crystals were recovered by filtration and washed with 1.0 kg of n-hexane. The crystals were recovered by filtration and dried under vacuum to obtain 169 g of the following compound (p14).

$^1$H-NMR (D$_2$O) δ (ppm): 3.40-4.00 (3, 636H, m, —O(CH$_2$CH$_2$O)$_m$CH$_2$—), 3.39 (3H, s, —C$\underline{H_3}$), 3.14 (2$\overline{H, t,}$ —C$\underline{H_2NH_2}$)

HPLC: 95%

Example 6

Synthesis of Polyoxyalkylene Derivative (1) (In the case where R=t-butyl; Polymer$^1$=polyoxyethylene; X=amino; Z=residue formed by removing the hydroxyl groups from ethylene glycol; a=1; b=1; n=0; and the molecular weight is about 40,000)

Two hundred grams (5.0 mmol) of a mono-t-butoxypoly(ethylene oxide) (p8) and 600 g of toluene were introduced into a 1-L four-necked flask equipped with a thermometer, nitrogen bubbling tube, stirrer, Dean-Stark tube, and condenser. The contents were heated to 60° C. with stirring and nitrogen bubbling to dissolve the compound (p8). The solution was heated to 110° C., and about 300 g of a fraction was distilled off under azeotropic condition with toluene. Dehydration was thus conducted. The solution was cooled to 40° C., and 1.0 kg of dehydrated chloroform was added thereto. Furthermore, 2.2 g (15.0 mmol) of phthalimide and 3.9 g (15.0 mmol) of triphenylphosphine were added. Thereafter, 3.0 g (15.0 mmol) of diisopropyl azodicarboxylate was added, and the mixture was reacted at room temperature for 2 hours.

Thereto was added 3.0 g (50.0 mmol) of ethylenediamine. The resultant mixture was reacted at 60° C. for 4 hours. Thereto were added 2.0 kg of toluene and 50 g of an adsorbent (Kyowaad 700, manufactured by Kyowa Chemical Industry Co., Ltd.; trade name). This mixture was stirred at 40° C. for 30 minutes to perform an adsorption treatment, and was then filtered. About 2.0 kg of a fraction was removed at 40° C. under slightly reduced pressure and then cooled to room temperature. Thereto was added 1.0 kg of n-hexane to perform crystallization. The crystals were recovered by filtration and then dissolved in 2.0 kg of ethyl acetate at 40° C. After the solution was cooled to room temperature, 1.0 kg of n-hexane was added to perform crystallization. The crystals were recovered by filtration and washed with 1.0 kg of n-hexane. The crystals were recovered by filtration and dried under vacuum to obtain 179 g of the following compound (p15).

$^1$H-NMR (D$_2$O) δ (ppm): 3.40-4.00 (3, 636H, m, —O(CH$_2$CH$_2$O)$_m$CH$_2$—), 3.14 (2H, t, —C$\underline{H_2}$NH$_2$), 1.21 (9$\overline{H, s,}$ —C(C$\underline{H_3})_3$)

HPLC: 95%

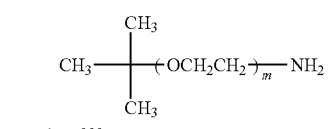

(p15)

m = about 909

Example 7

Synthesis of Polyoxyalkylene Derivative (1) (In the case where R=methyl; Polymer$^1$=polyoxyethylene; X=amino; Z=residue formed by removing the hydroxyl groups from glycerol; a=2; b=1; n=0; and the molecular weight is about 40,000)

Two hundred grams (5.0 mmol) of the compound (p10) and 600 g of toluene were introduced into a 1-L four-necked flask equipped with a thermometer, nitrogen bubbling tube, stirrer, Dean-Stark tube, and condenser. The contents were heated to 60° C. with stirring and nitrogen bubbling to dissolve the compound (p10). The solution was heated to 110° C., and about 300 g of a fraction was distilled off under azeotropic condition with toluene. Dehydration was thus conducted. The solution was cooled to 40° C., and 1.0 kg of dehydrated chloroform was added thereto. Furthermore, 2.2 g (15.0 mmol) of phthalimide and 3.9 g (15.0 mmol) of triphenylphosphine were added. Thereafter, 3.0 g (15.0 mmol) of diisopropyl azodicarboxylate was added, and the mixture was reacted at room temperature for 2 hours.

Thereto was added 3.0 g (50.0 mmol) of ethylenediamine. The resultant mixture was reacted at 60° C. for 4 hours. Thereto were added 2.0 kg of toluene and 50 g of an adsorbent (Kyowaad 700, manufactured by Kyowa Chemical Industry Co., Ltd.; trade name). This mixture was stirred at 40° C. for 30 minutes to perform an adsorption treatment, and was then filtered. About 2.0 kg of a fraction was removed at 40° C. under slightly reduced pressure and then cooled to room temperature. Thereto was added 1.0 kg of n-hexane to perform crystallization. The crystals were recovered by filtration and then dissolved in 2.0 kg of ethyl acetate at 40° C. After the solution was cooled to room temperature, 1.0 kg of n-hexane was added to perform crystallization. The crystals were recovered by filtration and washed with 1.0 kg of n-hexane. The crystals were recovered by filtration and dried under vacuum to obtain 173 g of the following compound (p16).

$^1$H-NMR (D$_2$O) δ (ppm): 3.40-4.00 (3, 636H, m, —CH$_2$O(CH$_2$CH$_2$O)$_m$—), CHO(CH$_2$CH$_2$O)$_m$—, 3.39 (6$\overline{H, s,}$ —C$\underline{H_3}$), 3.14 (2H, t, —C$\underline{H_2NH_2}$)

HPLC: 94%

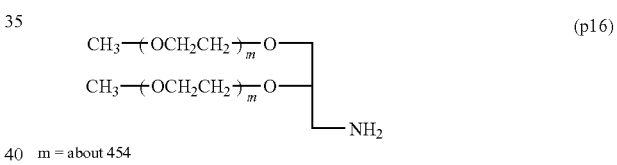

(p16)

m = about 454

Example 8

Synthesis of Polyoxyalkylene Derivative (1) (In the case where Polymer$^2$=polyoxyethylene; X=amino; Z=residue formed by removing the hydroxyl groups from pentaerythritol; a=0; b=4; n=1; and the molecular weight is about 20,000)

Two hundred grams (0.01 mol) of the compound (p12) and 600 g of toluene were introduced into a 1-L four-necked flask equipped with a thermometer, nitrogen bubbling tube, stirrer, Dean-Stark tube, and condenser. The contents were heated to 60° C. with stirring and nitrogen bubbling to dissolve the compound (p12). The solution was heated to 110° C., and about 300 g of a fraction was distilled off under azeotropic condition with toluene. Dehydration was thus conducted. The solution was cooled to 40° C., and 1.0 kg of dehydrated chloroform was added thereto. Furthermore, 11.8 g (0.08 mol) of phthalimide and 21.0 g (0.08 mol) of triphenylphosphine were added. Thereafter, 16.2 g (0.08 mol) of diisopropyl azodicarboxylate was added, and the mixture was reacted at room temperature for 2 hours.

Thereto was added 14.4 g (0.24 mol) of ethylenediamine. The resultant mixture was reacted at 60° C. for 4 hours. Thereto were added 2.0 kg of toluene and 50 g of an adsorbent (Kyowaad 700, manufactured by Kyowa Chemical Industry Co., Ltd.; trade name). This mixture was stirred at 40° C. for 30 minutes and filtered. Furthermore, 50 g of the adsorbent (Kyowaad 700, manufactured by Kyowa Chemical Industry Co., Ltd.; trade name) was added to the filtrate to perform an adsorption treatment step again. About 2.0 kg of a fraction was removed at 40° C. under slightly reduced pressure and then cooled to room temperature. Thereto was added 1.0 kg of n-hexane to perform crystallization. The crystals were recovered by filtration and then dissolved in 2.0 kg of ethyl acetate at 40° C. After the solution was cooled to room temperature, 1.0 kg of n-hexane was added to perform crystallization. The crystals were recovered by filtration and washed with 1.0 kg of n-hexane. The crystals were recovered by filtration and dried under vacuum to obtain 167 g of the following compound (p17).

$^1$H-NMR (D$_2$O) δ (ppm): 3.40-4.10 (1, 818H, m, C—CH$_2$O(CH$_2$CH$_2$O)$_m$CH$_2$—), 3.14 (8H, t, —CH$_2$NH$_2$)
HPLC: 97%

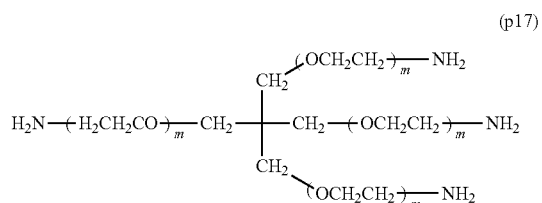

(p17)

m = about 114

Comparative Example 1

Compound (p2) was synthesized by the same production method as in an Example of JP-A-7-196925. Although the tosylate of a monomethoxypolyoxyethylene, compound (p5), was used as a starting material in the Example, compound (p5) was also synthesized because it was difficult to procure the compound.

Comparative Example 1-1

Synthesis of Tosylate of Monomethoxypolyoxyethylene, Compound (p5) (molecular weight, 5,000)

CH$_3$(OCH$_2$CH$_2$)$_m$OSO$_2$CH$_2$CF$_3$ m=about 114 (p5)

A hundred grams (0.02 mol) of a monomethoxypoly(ethylene oxide) (p1) and 600 g of toluene were introduced into a 1-L four-necked flask equipped with a thermometer, nitrogen bubbling tube, stirrer, Dean-Stark tube, and condenser. The contents were heated to 60° C. with stirring and nitrogen bubbling to dissolve the compound (p1). The solution was heated to 110° C., and about 120 g of a fraction was distilled off under azeotropic condition with toluene. Dehydration was thus conducted. The solution was cooled to 45° C., and 4.0 g (0.04 mol) of triethylamine and 5.5 g (0.03 mol) of 2,2,2-trifluoroethanesulfonyl chloride were added thereto. This mixture was reacted at 45° C. for 3 hours.

After the reaction, the resultant triethylamine salt was filtered off. Four hundred grams of ethyl acetate was added to the filtrate, and the mixture was cooled to room temperature. Thereafter, 600 g of n-hexane was added to perform crystallization. The crystals were recovered by filtration and then dissolved in 800 g of ethyl acetate at 40° C. After the solution was cooled to room temperature, 600 g of n-hexane was added to perform crystallization. The crystals were recovered by filtration and washed with 600 g of n-hexane. The crystals were recovered by filtration and dried under vacuum to obtain 88 g of the desired product (p5).

$^1$H-NMR (CDCl$_3$; internal reference, TMS) δ (ppm): 3.40-3.80 (454H, m, —O(CH$_2$CH$_2$O)$_m$CH$_2$—), 3.38 (3H, s, —CH$_3$), 4.53 (2H, m, —CH$_2$—OSO$_2$—), 4.24 (2H, q, —OSO$_2$—CH$_2$—CF$_3$)

Comparative Example 1-2

Synthesis of t-Butoxycarbonylaminooxy Form of Monomethoxypolyoxyethylene, Compound (p6) (molecular weight, 5,000)

CH$_3$(OCH$_2$CH$_2$)$_m$ONHCO$_2$t-Bu m=about 114 (p6)

Eighty grams (16 mmol) of the compound (p5) obtained in (Comparative Example 1-1) and 400 mL of dichloromethane were introduced into a 500-mL four-necked flask equipped with a thermometer, nitrogen bubbling tube, stirrer, and condenser. The contents were stirred to dissolve the compound (p5). Thereto were added 21.2 g (0.16 mol) of t-butyl N-hydroxycarbamate and 20.2 g (0.20 mol) of triethylamine. A reaction was allowed to proceed at 45° C. (refluxing) overnight.

After the reaction, 1 L of cold diethyl ether was added to the liquid reaction mixture to perform crystallization. The crystals were recovered by filtration and washed with 600 mL of cold diethyl ether. The crystals were recovered by filtration and dried under vacuum to obtain 60 g of the desired product (p6).

$^1$H-NMR (CDCl$_3$; internal reference, TMS) δ (ppm): 3.40-3.80 (454H, m, —O(CH$_2$CH$_2$O)$_m$CH$_2$—), 3.38 (3H, s, —CH$_3$), 1.44 (9H, s, —C(CH$_3$)$_3$)

Comparative Example 1-3

Synthesis of Oxyamine Form of Monomethoxypolyoxyethylene, Compound (p2) (molecular weight, 5,000)

CH$_3$(OCH$_2$CH$_2$)$_m$ONH$_2$ m=about 114 (p2)

Sixty grams (12 mmol) of the compound (p6) obtained in (Comparative Example 1-2) was dissolved in a dichloromethane/trifluoroacetic acid (3:7) mixture in a 300-mL four-necked flask equipped with a thermometer, nitrogen bubbling tube, stirrer, and condenser. The resultant solution was reacted at room temperature for 1 hour. After the reaction, the solution was concentrated. The solution obtained was purified by gel filtration through column LH-20 (methanol/dichloromethane (5:1)). n-Hexane was added to the purified solution to perform crystallization. The crystals were recovered by filtration and dried under vacuum to obtain 26 g of the desired product (p2).

$^1$H-NMR (D$_2$O) δ (ppm): 3.40-4.00 (454H, m, —O(CH$_2$CH$_2$O)$_m$CH$_2$—), 3.38 (3H, s, —CH$_3$)
HPLC: 95%

Comparative Example 2

A polyoxyethylene having a molecular weight of 5,000 was used with reference to an Example of U.S. Pat. No. 6,825,331.

Comparative Example 2-1

Synthesis of Phthalimide Compound of Monomethoxypolyoxyethylene, Compound (p7) (molecular weight, 5,000)

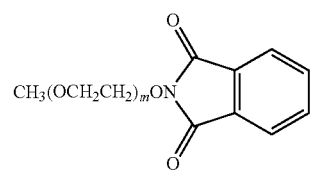

(p7)

m = about 114

Fifty grams (20 mmol) of a monomethoxypoly(ethylene oxide) (p1) and 1,500 mL of tetrahydrofuran were introduced into a 2-L four-necked flask equipped with a thermometer, nitrogen bubbling tube, stirrer, and condenser. The compound (p1) was dissolved. Thereto were added 3.5 g (21.5 mmol) of N-hydroxyphthalimide and 5.5 g (21 mmol) of triphenylphosphine. Thereafter, 3.5 mL (18 mmol) of diisopropyl azodicarboxylate was gradually added dropwise thereto, and a reaction was allowed to proceed at room temperature overnight.

After the reaction, the reaction solution was concentrated. The solution obtained was purified with a silica gel column [conditions in the Example of U.S. Pat. No. 6,825,331: eluted using a gradient from neat dichloromethane to dichloromethane/methanol (97:3)]. However, because the starting material was a high-molecular substance having a molecular weight of 5,000, it was difficult to elute the desired product under the conditions used in the Example. The eluent was hence changed so as to have a gradient to dichloromethane/methanol (93:7). As a result, the desired product was obtained. However, the unreacted monomethoxypoly(ethylene oxide) (p1) also had been eluted, and it was difficult to separate the two substances. n-Hexane was added to the purified solution to perform crystallization, and the crystals were recovered by filtration and dried under vacuum to obtain 36 g of the desired product (p7).

$^1$H-NMR (CDCl$_3$; internal reference, TMS) δ (ppm): 3.40-3.80 (454H, m, —O(CH$_2$CH$_2$O)$_m$CH$_2$—), 3.38 (3H, s, —CH$_3$), 7.70-7.85 (4H, m, Ph)

Degree of phthalimide introduction: 89% (calculated through $^1$H-NMR)

Value determined by taking the integral of the methoxy-group-derived peak at δ of 3.38 ppm as 3, dividing the integral of the phthalimide-group-derived peak at 7.70-7.85 ppm by 4, and converting the quotient to a percentage.

Comparative Example 2-2

Synthesis of Oxyamine Form of Monomethoxypolyoxyethylene, Compound (p2) (molecular weight, 5,000)

Twenty-five grams (5.0 mmol) of the compound (p7) obtained in (Comparative Example 2-1) and 500 mL of 0.5-M acetic acid solution of hydrazine (hydrazine monohydrate/pyridine/acetic acid=0.124/4/1) were introduced into a 1-L four-necked flask equipped with a thermometer, nitrogen bubbling tube, stirrer, and condenser. The compound (p7) was dissolved. The solution was reacted at room temperature for 30 minutes. In the Example of U.S. Pat. No. 6,825,331, the reaction product in an oxyamine form was not isolated but reacted directly with an aldehyde compound. The yield and purity of the product itself are hence unclear. Purification was performed using crystallization, which is one of general purification techniques for removing low-molecular compounds from high-molecular compounds. The crystals were recovered by filtration and dried under vacuum to obtain 22 g of the desired product (p2).

$^1$H-NMR (D$_2$O) δ (ppm): 3.40-4.00 (454H, m, —O(CH$_2$CH$_2$O)$_m$CH$_2$—), 3.38 (3H, s, —CH$_3$)

HPLC: 87%

TABLE 1

|  | Degree of phthalimide introduction*[1] | Degree of oxyamino introduction*[2] |
| --- | --- | --- |
| Example 1-1 | >99% | 99% |
| Comparative Example 1 | — | 95% |
| Comparative Example 2 | 89% | 87% |

*[1] determined through NMR
*[2] determined through HPLC

As shown in Table 1, the polyoxyalkylene derivative having oxyamino groups (p2) obtained in the production method of the invention (Example 1-1) had a higher purity regarding the degree of oxyamino introduction than those in Comparative Example 1 and Comparative Example 2 although purification by gel filtration and purification with a silica gel column were performed during the steps in Comparative Example 1 and Comparative Example 2, respectively. The reaction in Comparative Example 2-1, which was carried out in accordance with an Example of U.S. Pat. No. 6,825,331, resulted in a low degree of phthalimide introduction. This indicates that the low degree of phthalimide introduction was due to the insufficient reagent amount because it is thought that the functional groups of the polymer molecules showed reduced reactivity due to the increased molecular weight of the polymer.

In the invention, the reaction intermediate has an exceedingly satisfactory degree of phthalimide introduction, and the desired product can be obtained without arousing a considerable decrease in purity in the deprotection step. Because of this, a high-purity polyoxyalkylene derivative having oxyamino groups can be obtained in the invention by merely removing low-molecular compounds by simple adsorption treatment or crystallization without using purification, such as gel filtration or column chromatography, that is performed in order to isolate a desired product.

TABLE 2

|  | Yield a | Yield b | Yield c | Overall yield |
| --- | --- | --- | --- | --- |
| Example 1-1 | — | — | — | 90% |
| Comparative Example 1 | 88% | 75% | 43% | 28% |
| Comparative Example 2 | 72% | 88% | — | 62% |

Yield a: yield in Comparative Examples 1-1 and 2-1
Yield b: yield in Comparative Examples 1-2 and 2-2
Yield c: yield in Comparative Example 1-3
Overall yield (Comparative Example 1): (yield a) × (yield b) × (yield c)/10000
Overall yield (Comparative Example 2): (yield a) × (yield b)/100

As shown by the results given in Table 2, in which the yields of compound (p2) are compared, the method for production of the invention can give the final product (p2) through a series of steps and is free from a considerable decrease in yield through the purification step. Because of this, the desired product can be obtained in a higher yield as compared with the production methods shown as the Comparative Examples. It can be seen that in Comparative Example 1 and Comparative Example 2, the gel filtration and the silica gel column purification both resulted in a considerable decrease in yield. The yield in the invention was about 3 times that in Comparative Example 1.

The invention is a useful production method by which a high-purity polyoxyalkylene derivative (1) having a high molecular weight and having an oxyamino group or amino group can be industrially and efficiently produced while greatly improving product yield.

What is claimed is:

1. A method for producing a polyoxyalkylene derivative represented by the following formula (1), the method comprising successively performing the following steps (A), (B), and (C)

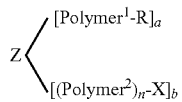
(1)

wherein Z is a residue of a compound having 2 to 8 active hydrogen atoms; Polymer$^1$ and Polymer$^2$ each independently represent a polymer of an oxyalkylene group having 2 to 4 carbon atoms, Polymer$^1$ and Polymer$^2$ may have a side chain, and the polyoxyalkylene derivative represented by the formula (1) has an overall molecular weight of 1,000 to 160,000; R represents either a hydrocarbon group having 1 to 20 carbon atoms or a protected functional group; X represents an oxyamino group or an amino group; a and b each independently are $0 \leqq a \leqq 8$, $1 \leqq b \leqq 8$, and $2 \leqq a+b \leqq 8$; and n is 1 or 0:

step (A): a step in which a polyoxyalkylene derivative having hydroxyl group(s) represented by the following formula (2) is reacted with a phthalimide derivative in the presence of an azo reagent and a phosphine reagent,

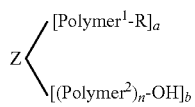
(2)

wherein Z, Polymer$^1$, Polymer$^2$, R, a, b, and n are the same as defined above;

step (B): a step in which deprotection of the phthalimide group(s) of the compound obtained in the step (A) is performed using a deprotection reagent comprising an organic base having a primary amino group;

step (C): a step in which impurities derived from the phthalimide derivative and the deprotection reagent are removed using step (C1) or (C2):

step (C1): an adsorption step in which an adsorbent is used in an organic solvent;

step (C2): an extraction step in which an organic solvent and an aqueous solution of an inorganic salt are used.

2. The method for production according to claim 1, wherein step (A) includes a dehydration step for removing water contained in the polyoxyalkylene derivative represented by the formula (2), the dehydration step is a step, in which organic solvent, in which the polyoxyalkylene derivative represented by the formula (2) is dissolved, is refluxed, 1 to 10 times by weight the polyoxyalkylene derivative represented by the formula (2) of organic solvent is used, and 5 to 75% by weight of the organic solvent is refluxed and distilled away at the azeotropic point or higher.

3. The method for production according to claim 1, wherein the phthalimide derivative to be used in step (A) is hydroxyphthalimide or phthalimide, and an amount of the phthalimide derivative is 1 to 20 equivalents per hydroxyl group of the polyoxyalkylene derivative represented by the formula (2).

4. The method for production according to claim 1, wherein the azo reagent to be used in step (A) is diethyl azodicarboxylate or diisopropyl azodicarboxylate, and an amount of the azo reagent is 1 to 20 equivalents per hydroxyl group of the polyoxyalkylene derivative represented by the formula (2).

5. The method for production according to claim 1, wherein the phosphine reagent to be used in step (A) is triphenylphosphine, and an amount of the phosphine reagent is 1 to 20 equivalents per hydroxyl group of the polyoxyalkylene derivative represented by the formula (2).

6. The method for production according to claim 1, wherein the deprotection reagent to be used in step (B) is ethylenediamine, diethylenetriamine, or tris(2-aminoethyl)amine, and an amount of the deprotection reagent is 3 to 200 equivalents per hydroxyl group of the polyoxyalkylene derivative represented by the formula (2).

7. The method for production according to claim 1, wherein the organic solvent to be used in step (C1) is selected from toluene, ethyl acetate, chloroform, dichloromethane, acetonitrile, and tetrahydrofuran, and an amount of the organic solvent is 3 to 20 times by weight the amount of the polyoxyalkylene derivative represented by the formula (2).

8. The method for production according to claim 1, wherein the adsorbent to be used in step (C1) is an adsorbent comprising any of aluminum oxide, magnesium oxide, and silicon dioxide, and an amount of the adsorbent is 0.1 to 5 times by weight the amount of the polyoxyalkylene derivative represented by the formula (2).

9. The method for production according to claim 1, wherein the organic solvent to be used in step (C2) is selected from toluene, chloroform, and dichloromethane, and an amount of the organic solvent is 3 to 20 times by weight the amount of the polyoxyalkylene derivative represented by the formula (2).

10. The method for production according to claim 1, wherein the aqueous solution to be used in step (C2) is a 1 to 25% by weight aqueous solution of an inorganic salt of an alkali metal, and an amount of the aqueous solution is 1 to 20 times by weight the amount of the polyoxyalkylene derivative represented by the formula (2).

* * * * *